United States Patent [19]

Josteit

[11] 3,895,990

[45] July 22, 1975

[54] PROCESS FOR JOINING STRIPS OF BELT ALONG THEIR LENGTHWISE RUNNING SIDE EDGES

[75] Inventor: Heinz Josteit, Frechen-Bachem, Germany

[73] Assignee: Rheinische Braunkohlenwerke AG, Cologne, Germany

[22] Filed: July 27, 1972

[21] Appl. No.: 275,755

[30] Foreign Application Priority Data
July 30, 1971 Germany.......................... 2138132

[52] U.S. Cl. ................ 156/304; 156/157; 156/159; 156/313
[51] Int. Cl. .............................................. C09j 5/10
[58] Field of Search ........ 156/66, 91, 92, 94, 303.1, 156/304, 306, 313, 137, 157, 159, 293

[56] References Cited
UNITED STATES PATENTS

| | | | |
|---|---|---|---|
| 2,388,297 | 11/1945 | Slaughter............................ | 156/304 |
| 3,342,656 | 9/1967 | Papageorges...................... | 156/304 |

FOREIGN PATENTS OR APPLICATIONS

| | | | |
|---|---|---|---|
| 1,356,288 | 2/1964 | France................. | 156/304 |
| 1,308,557 | 10/1962 | France................. | 156/304 |
| 735,795 | 8/1955 | United Kingdom................. | 156/304 |
| 1,903,881 | 7/1970 | Germany.......................... | 156/304 |

*Primary Examiner*—Caleb Weston
*Attorney, Agent, or Firm*—Connolly and Hutz

[57] ABSTRACT

This invention relates to a process and apparatus for joining strips of belt along their lengthwise running side edges, e.g., for repairing conveyor belts having lengthwise extending cracks, wherein the side edges of the joined strips of belt are beveled on either one or both sides, and the space between the beveled side edges is filled in by inserting a profiled fillet strip having elastic rubber properties, which is sealed in the side edges by cohesion and/or adhesion. A U-shaped frame supporting a cutting tool is provided for beveling the side edges of the belt to receive and engage with the fillet strip. Adjustable rollers on the frame contact the belt to guide the position and angle of the tool relative to the belt and to adjust the cut.

11 Claims, 8 Drawing Figures

PROCESS FOR JOINING STRIPS OF BELT ALONG THEIR LENGTHWISE RUNNING SIDE EDGES

BACKGROUND OF THE INVENTION

In a known process for the repairing of lengthwise cracks in conveyor belts, first both strips to be connected together are cut to size by hand at their side edges facing each other and running lengthwise and are beveled thereby, whereupon the space in the bevels between the two belt strips is filled in layers. The filling material, which at the same time provides a bond between the two belt strips, consists of rubber films each having a thickness of about 1 mm. In this connection, between each pair of succeeding films there is applied a solvent coating, which effects the bonding of the films to each other and to the two strips of belt. Since presently used conveyor belts are considerably thick and therefore require a number of such filling layers, this type of repairing or joining of belt strips is unduly laborious, hence time-consuming and therefore costly. This filling procedure is also complicated in that the space to be filled in the prescribed manner widens in cross-section from the center plane of the belt toward one or even both surfaces. For this reason, the insertion of the individual layers must be performed with particular care. It is furthermore disadvantageous that considerable losses of material occur, since the individual layers, consisting of rubber sheets, must be trimmed off after their application to the required width.

The object of the invention is to simplify this known joining process. In particular, the requirement of having a large number of individual layers to be joined together and to be subsequently processed should be avoided. It is a further object to simplify the necessary preparations of the belt strips and their adjacent side edges and to provide a convenient apparatus for accomplishing these purposes, the use of which serves both to reduce the total required labor and time expenditures.

SUMMARY

To solve this problem, it is suggested according to the invention to interpose a profiled or contoured fillet strip between the side edges to be connected together after the side edges of the belt strips have been profiled to correspond to the cross-sectional form of the profiled fillet strip. This preparation, according to a further suggestion of the invention, consists of profiling the side edges during the original manufacture of the belt strips. This applies particularly to such instances wherein the processed belt strips are subsequently to be joined to form relatively wide conveyor belts. The profiled fillet strip may be connected with the side edges of the belt strips by means of cementing, cold or hot vulcanization or the like.

In this manner it is possible to join together two belt strips in considerably shorter time and by considerably simpler means than heretofore possible. In place of a number of individual layers, a prefinished profiled fillet strip is used, the space to be filled by this profiled fillet strip being adapted to correspond to the cross section of the fillet strip, by corresponding preparation of the side edges defining this space. The profiled fillet strip may consist of rubber, plastic or other suitable material, in which it is important that the profiled-fillet-forming substance have a flexiblity corresponding approximately to that of the belt. Furthermore, the profiled strip should have a durability which approximately coincides with that of the covering layer of the belt.

The use of a fillet strip having a T or a double T shaped cross section has been proven to be particularly suitable, the profiled fillet having a one-part of a multiple-part construction.

To perform the process according to the invention, both adjacent side edges of the belt strips to be connected together must be prepared with the intended purpose of adapting their shape to the form of the profiled fillet. The invention provides here for the possibility of using an apparatus, which is characterized in that U-shaped frame supporting a cutting tool is provided which engages the side edge to be processed, for which purpose the frame is provided with rollers, wheels, guides or the like engaging it with the belt strip. These rollers, wheels, guides or the like are suitably mounted to be adjustable for adapting it in this manner to adjust the cut to the conditions encountered at a given time. In addition, there is also the possibility of adjusting the cutting and the setting angle of the cutting tool by means of an adjustment of the rollers or the like and consequently of the frame. Furthermore, the cutting tool may be adjustably mounted on the frame.

In addition, there may be provided a buffing tool or the like, e.g. in the shape of a brush, in place of or in addition to the cutting tool(s), e.g. a heated blade as the case may be. This tool has the purpose of preconditioning the surface with which the fillet is to be connected in order to provide the best possible adhesion between the profiled fillet strip and the belt strip or side edge.

The invention is not limited only to the repair of damages resulting from lengthwise tears but may also be advantageously utilized to prepare a wide conveyor belt from narrow conveyor belt strips. This possibility is therefore of particular importance, because in the modern conveyor technology, the belts take on increasingly larger dimensions, and indeed particularly in their width. Problems inevitably result in transporting these large conveyor belts from their place of manufacture to the consumer. The invention provides the possibility of preparing narrower conveyor belt strips, of bringing them to the consumer separately and of joining them together in the described manner at the place of use. This then does not involve repair but a type of final assembly, where the teaching of this invention, however, may be applied in a similar manner as utilized for repairing damage to belts caused by lengthwise tears or cracks.

Novel features and advantages of the present invention will become apparent to one skilled in the art from a reading of the following description in conjunction with the accompanying drawings wherein similar reference characters refer to similar parts and in which:

DESCRIPTION OF THE PREFERRED EMBODIMENTS

Figure 1:
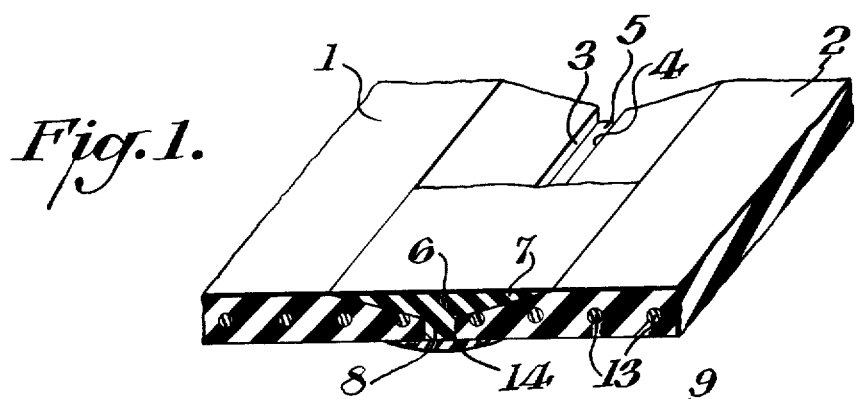
FIGS. 1–5 are each a partial perspective illustration of a conveyor belt, consisting of two conveyor belt strips joined together by means of a profiled fillet strip in accordance with this invention.

FIGS. 1–5 each show two belt strips 1 and 2, which are to be connected together at their lengthwise running adjacent side edges 3 and 4. Both strips 1 and 2 may be parts of an undivided conveyor belt damaged by a tear 5 (FIG. 1). However, both strips 1 and 2 may also be considered to represent individual conveyor belt strips, which are to be united to form one wide belt, where the strips to be connected may be already preprofiled at their adjacent side edges.

In both instances, the procedure is such that a profiled fillet strip is inserted between belt strips 1 and 2, after the side edges 3 and 4 (FIG. 1) were previously conditioned to have their cross sections correspond to the shape of the profiled fillet strip. The connection between the profiled fillet and the belt strips 1 and 2 may be accomplished by vulcanization, cementing or the like.

Figure 2:
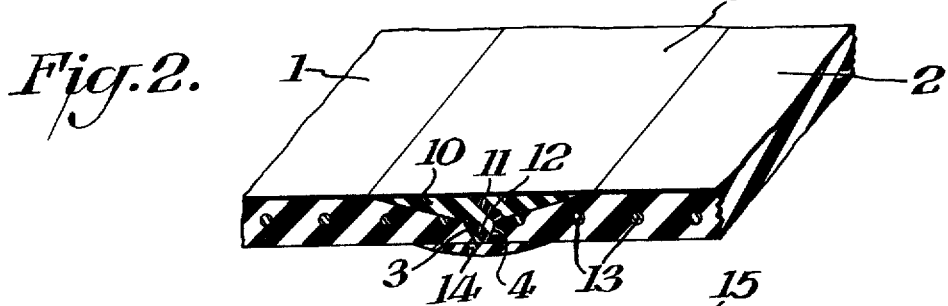

In the exemplary embodiment of FIG. 1, the profiled fillet 6 has a T-shaped cross-section, which cross section, comprised by a flange 7 ending in an outer surface and the stem 8 situated in the interior. However, the profiled fillet 9 in the exemplary embodiment of FIG. 2 is distinguished in that its flange 10 transforms into stem 12 by way of an area 11, having a curved cross section. The most suitable cross-sectional form also depends on the position of any reinforcing inserts in the conveyor belt. They may, for example, be steel cable 13, according to the exemplary embodiments illustrated in FIGS. 1 through 4, which primarily serve to transmit longitudinal forces. The presence of such cables or other reinforcing inserts, however, does interfere with utilization of the profiled fillets of this invention.

The novel joining may be completed by means of a thin covering strip 14, according to FIGS. 1 and 2, which on the side of the conveyor belt facing the stem 8 or 12 of the profiled fillet 6 or 9, covers the space left by the profiled fillet or its stem between the two strips 1 and 2. The seal accordingly provided is generally not required on the other side of the belt, since there the wide flange 7 or 10 of the profiled fillet automatically provides a seal.

Figure 3:
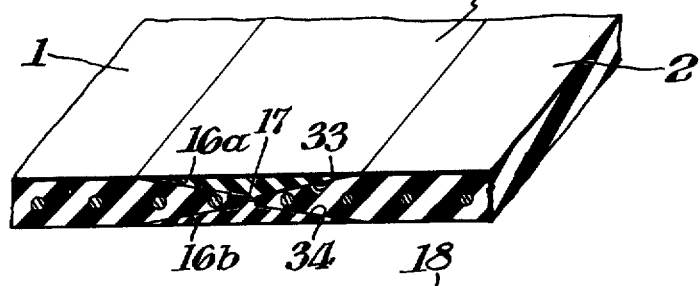

In the exemplary embodiment illustrated in FIG. 3, the profiled fillet 15 consists of two fillet portions 16a and 16b, which combine to form a double-T-shaped profiled fillet. Here too it is apparent that the adjacent side edges of both belt strips 1 and 2 are conditioned or preformed to correspond to the cross-sectional form of the profiled fillet so that all parts fit together perfectly. It is suitable to join together both fillet portions at their contact surfaces 17 also by cementing or otherwise in a suitable manner. Furthermore, there is also the possibility of manufacturing profile fillet 15 in one piece.

Figure 4:
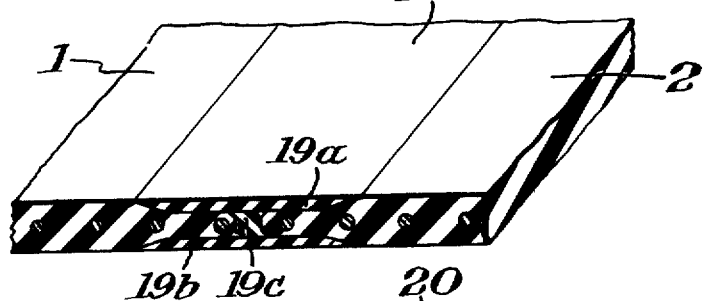

The joint of FIG. 4 also uses a double-T-shaped profiled fillet 18, which is fitted together from three fillet portions 19a, 19b and 19c, wherein the fillet portion 19c in the center cross-sectional area takes over a considerable part of the connection between the two belt strips 1 and 2. The fillet portions 19a and 19b are also situated in the space between the two belt strips 1 and 2 to be joined together and are additionally functionally similar to the covering strip 14 of the exemplary embodiments of FIGS. 1 and 2.

Figure 5:
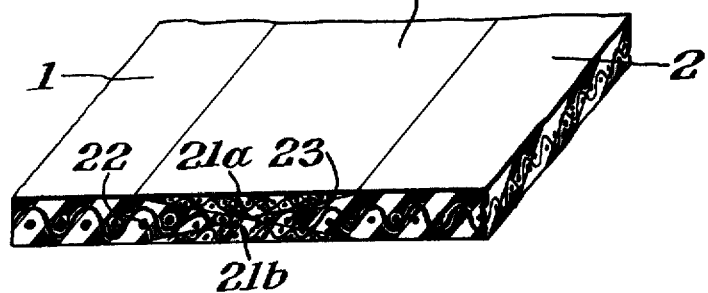

The example of a joint in a belt reinforced by fabric inlays is represented by the exemplary embodiment according to FIG. 5. In this connection, the profiled fillet 20 is composed of two profiled fillet portions 21a and 21b, which may also be equipped with fabric inlays if necessary. The adjacent side edges 22 and 23 of the two belt strips 1 and 2 are again conditioned or preformed in the previously described manner.

Figure 6:
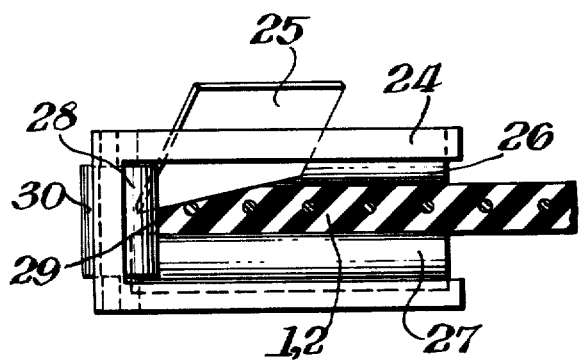
FIG. 6 is a front view in elevation of a cutting apparatus performing a process of this invention.
Figure 7:
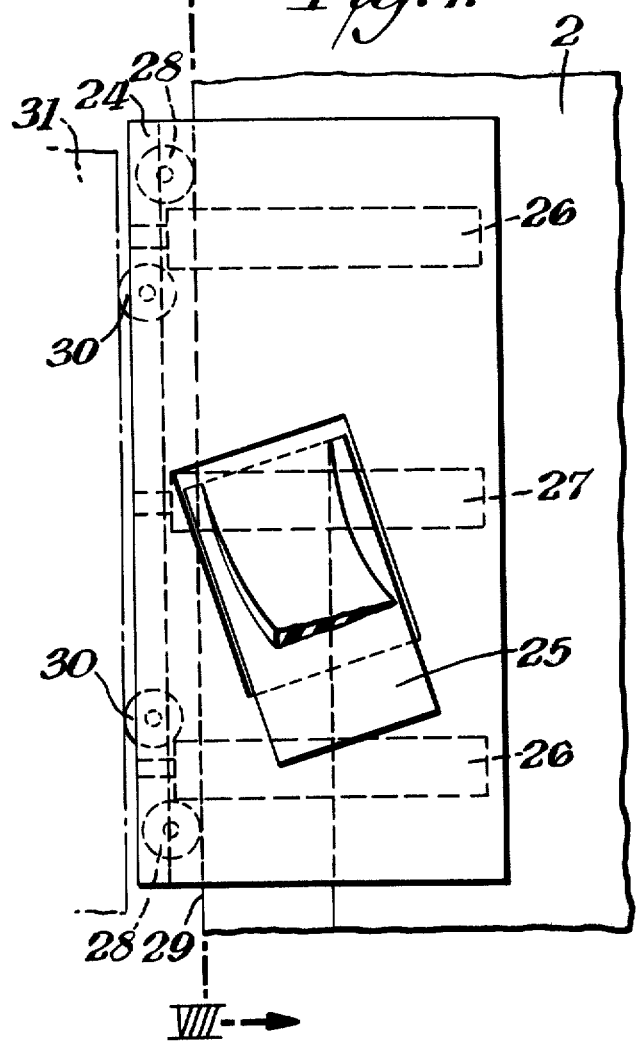
FIG. 7 is top view of the cutting apparatus shown in FIG. 6.
Figure 8:
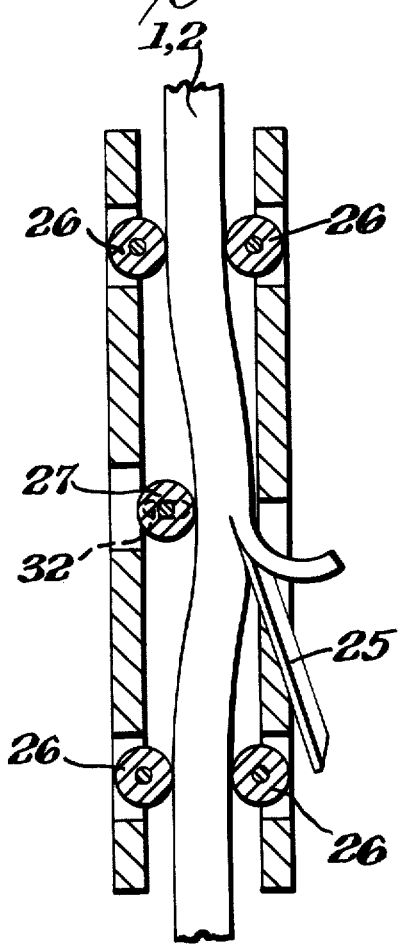
FIG. 8 is the side view of the cutting apparatus shown in FIGS. 6 and 7.

The device, illustrated in FIGS. 6–8, for the conditioning of the edges of belts made of rubber or similar resilient materials, e.g. conveyor belts, essentially consists of a U-frame 24, which in its working position engages the conveyor belt or the belt strip 1, 2. Frame 24 supports a blade 25, whose cutting angle is set by the position to the frame 24, since the latter takes on a certain position vis-a-vis the cross section of the belt strip 2 because of transporting means yet to be mentioned. In order to adapt to the particular requirements, the blade 25 is adjustable. The transporting or conveying means consist, for example, of rollers 26, wherein one or several roller pairs may be driven and may lie against the supporting and contact sides of the belt strip. Furthermore, an outer support 27 is provided, which may have the shape of a roller, cylinder, or the like and abuts the other belt side, as well as a set of rollers 28, which is arranged to contact the side edge 29 to be processed. Rollers 30, furthermore provided serve as gliding and supporting rollers of an opposite fillet contacting edge or lateral surface of a belt strip 31. Roller 27 may be adjustable within its holder 32. The invention furthermore provides the possibility also of adjusting the other rollers, so that in each instance, contact of the frame 24 and consequently of the blade 25 is assured with reference to the side edge 29 to be processed or to the particular edge area making it possible to position the cut also over considerably long lengths in precisely the desired manner. The surfaces of roller 26 may be constructed in such a manner that they may transmit the required tractive and lateral froces.

In place of an automatic drive, the device may also be pulled by means of a cable along the edge to be processed. Furthermore, the use of the device is not limited to the processing of the side surfaces of belt strips but also for the execution of other cuts, e.g. for the removal in layers of conveyor belt material for the purpose of undertaking a repair.

For the preparation of a joint, e.g. according to FIGS. 1 and 2, the device illustrated in FIGS. 6 to 8 must be moved along each of the belt strips to be connected together. In the exemplary embodiment of FIG. 3, four cutting procedures are required, i.e., two at each strip. It is naturally within the scope of the invention to provide also other cutting tools on the cutting apparatus, so that areas 33 and 34, proceeding at an angle, of each belt strip 1 or 2 in the illustrative example of FIG. 3 may be prepared in a single operation.

Finally, it is also within the scope of the invention to provide profiled fillets of the above-described type for executing the process of this invention and to provide belts repaired or prepared in accordance with the process.

I claim:

1. A process for joining belt strips together along their lengthwise running side edges wherein the side edges of the belt strips are slightly spaced apart and beveled to provide an intermediate area having a double tapered outer section and a stub-shaped root section, the intermediate area situated between these side edges being filled and sealed by inserted material having elastic rubber properties characterized in that between the side edges to be connected together there is arranged a profiled fillet strip, the profiled fillet strip comprising a double tapered outer section and a stub-shaped root section substantially corresponding to the intermediate area between the side edges of the joined belt strips, the profiled fillet strip being sealed with the side edges of the joined belt strips by being bonded thereto and the outer surface of the joined belt strips and profiled fillet strip being substantially even and smooth.

2. A process as set forth in claim 1 wherein the sealing is accomplished by vulcanization.

3. A process as set forth in claim 1 characterized by the use of a profiled fillet strip shaped in cross section in approximately the form of a T.

4. A process as set forth in claim 1 characterized by the use of a profiled fillet strip shaped in cross section approximately like a double T.

5. A process as set forth in claim 1 characterized in that the profiled fillet portions include a stem and a flange which are assembled and fitted together.

6. A process as set forth in claim 1, characterized in that in addition to the fillet strip, the space between both belt strips is bridged by a covering strip attached to the belt.

7. A process as set forth in claim 1, characterized in that the fillet strip includes a stem and the covering strip is applied to the stem side of the fillet strip and belt.

8. A process as set forth in claim 1, characterized in that the profiled fillet strip is assembled of two or more fillet portions and the portions are sealed together.

9. A process as set forth in claim 8, characterized in the fillet portions are inserted from both sides of the belt.

10. A process as set forth in claim 1, characterized in that the side edges are previously profiled in the manufacture of the belt strips to have the bevels.

11. A process as set forth in claim 1, characterized in that the profiled fillet strip is sealed with the side edges of the belt strips by means of cementing.

* * * * *